United States Patent [19]

Haynes

[11] Patent Number: 4,495,553
[45] Date of Patent: Jan. 22, 1985

[54] VEHICLE LIGHT ASSEMBLY

[76] Inventor: Charles W. Haynes, Pine St., South Dayton, N.Y. 14138

[21] Appl. No.: 513,405

[22] Filed: Jul. 14, 1983

[51] Int. Cl.³ .............................................. F21V 3/00
[52] U.S. Cl. ................................ 362/311; 116/35 R; 116/56; 340/84; 340/103; 362/72; 362/353; 362/355; 362/361; 362/368; 362/375
[58] Field of Search ............... 340/84, 103; 116/35 R, 116/56; 362/72, 311, 353, 355, 361, 368, 375

[56] References Cited

U.S. PATENT DOCUMENTS 2,416,160  2/1947  Davidsson ............................ 362/72

Primary Examiner—Stephen J. Lechert, Jr.
Attorney, Agent, or Firm—Mason, Fenwick & Lawrence

[57] ABSTRACT

A turn signal light housing has a translucent lens of arrow shaped configuration mounted on the housing in place of conventional circular lens without any need for modification of the housing.

19 Claims, 5 Drawing Figures

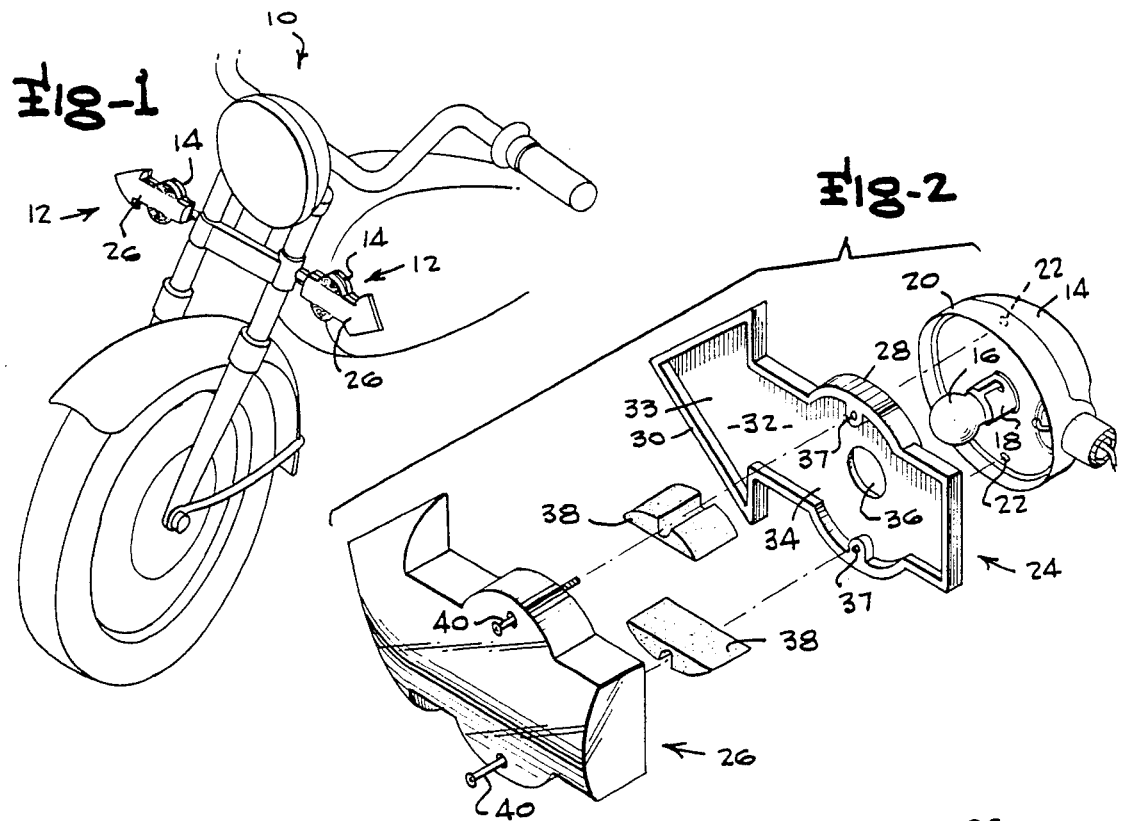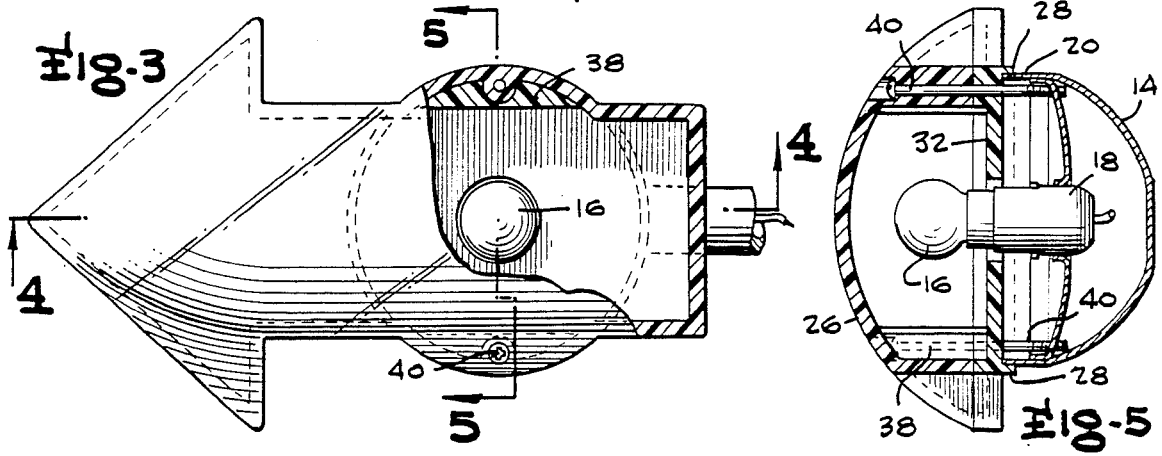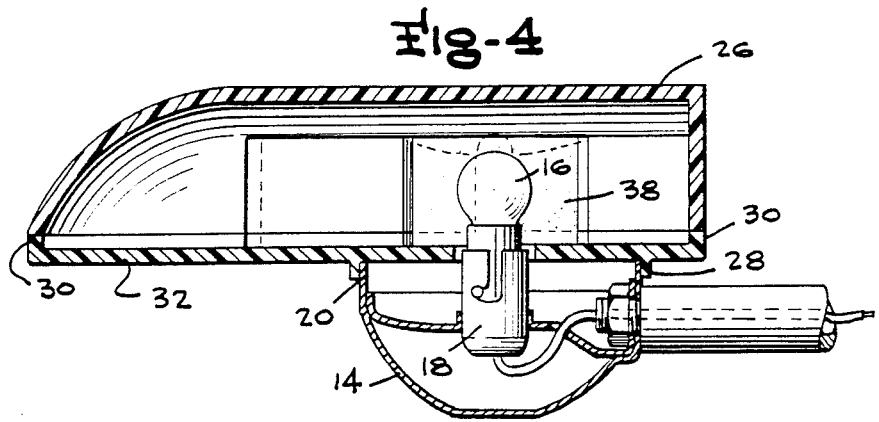

VEHICLE LIGHT ASSEMBLY

BACKGROUND OF THE INVENTION

The present invention is in the field of motor vehicle light assemblies and is more specifically directed to a unique turn signal assembly for motorcycles.

Prior known turn signals for use on motorcycles have for the most part comprised a circular shaped bulb housing having a circular lens covering the bulb so that upon illumination of the bulb the circular lens is illuminated; a smaller percentage of the turn signals are rectangular. However, the close proximity of the two turn signals of a motorcycle, whether they be round or rectangular, which is necessitated by the relatively narrow width of a motorcycle can sometimes lead to confusion as to the direction in which the motorcycle is intending to turn. A substantial safety hazard is consequently presented. While this hazard could possibly be reduced or corrected by the substitution of new and different light assemblies having a more definite indication of direction of intended movement, substantial expenses would be involved in the replacement of the original turn signal equipment.

SUMMARY OF THE INVENTION

It is the primary object of the present invention to provide a new and improved turn signal indicator means for a motorcycle or other vehicle.

A further object of the present invention is the provision of a new and improved turn signal means that can be used in conjunction with the existing bulb housing of a motorcycle but which will provide improved direction indicating capability.

Achievement of the foregoing objects is enabled by the preferred embodiment of the invention which comprises a replacement lens assembly consisting of an opaque base portion and a translucent lens which are fitted on the existing bulb housing in place of the original circular lens employed thereon. The lens assembly is configured in the shape of an arrow pointing either right or left as required for the particular installation so that upon illumination of the bulb an illuminated arrow pointed in the desired direction is provided. The base member includes a cylindrical protrusion that is matingly fitted on the cylindrical housing of the bulb and also includes an aperture through which the bulb extends when the base member is positioned on the bulb housing. Threaded screw members retain the entire assembly in position on the bulb housing in a manner analogous to the manner in which the original circular lens member was retained on the bulb housing.

A better understanding of the construction of the preferred embodiment will be enabled when the following detailed description of the preferred embodiment is considered in conjunction with the appended drawings in which like reference numerals are used for the same parts as illustrated in the different figures.

BRIEF DESCRIPTION OF THE DRAWING

FIG. 1 is a perspective view of a motorcycle on which two turn signal lamps embodying the present invention have been mounted;

FIG. 2 is an exploded perspective view of the preferred embodiment;

FIG. 3 is a front elevation view of the preferred embodiment with portions removed for the purpose of illustrating internal components;

FIG. 4 is a sectional view taken along lines 4—4 of FIG. 3; and

FIG. 5 is a sectional view taken along lines 5—5 of FIG. 3.

DESCRIPTION OF THE PREFERRED EMBODIMENT

Attention is initially invited to FIG. 1 of the drawings which illustrates a motorcycle 10 having front turn signals 12 embodying the present invention and which provide an arrow indicating the direction of intended movement of the motorcycle.

The preferred embodiment of the invention comprises a bulb housing 14 in which a bulb 16 is mounted in a conventional socket 18. Housing 14 is of the conventional sort employed for turn signals on motorcycles and other vehicles and is normally provided with a dome-shaped translucent lens of circular configuration matingly fitted over an outer cylindrical housing portion 20 of the bulb housing 14 and which is held in position by threaded screw or bolt members received in apertures 22 in the housing 14. Unfortunately, the conventional dome-shaped bulbs employed with the housing 14 do not in and of themselves provide a direction indicating capability other than by the position of the housing 14 on either the right or left side of the vehicle.

The dome-shaped bulb of the conventional turn signal is replaced with the present invention by a lens assembly comprising a base portion 24 and an outer translucent lens 26 formed of plastic and having the capability of transmitting light of the particular color of the plastic.

Base portion 24 includes a rearwardly (the term "rearwardly" as used herein refers to the positioning of the front turn signal with respect to the motorcycle 10 as shown in FIG. 1) extending cylindrical protrusion 28 having an inner diameter slightly greater than the outer or forward cylindrical housing portion 20 of the bulb housing 14 over which it is matingly positioned as best shown in FIGS. 4 and 5. Base portion 24 has its periphery defined by a forwardly extending flange 30 extending forwardly from a base plate 32. It will be seen that the flange 30 consists of nine linear elements and two arcuate elements aligned with the rearwardly extending cylindrical protrusions 28. Flange 30 defines the outer periphery of the base portion which is in the form of an arrow symbol having a direction indicating ability. The arrow symbol consists of a head portion 32 and a shaft portion 34. The cylindrical flange portions bulge outwardly from the upper and lower portions of the shaft portion 34 of the arrow symbol and a bulb receiving aperture 36 is provided in the base plate 32 and is axially aligned with the bulb 16 and its socket 18. Opaque light shields 38 are positioned in the shaft portion of the base portion and the translucent lens 26, which has a periphery contiguous with flange 30 is positioned over the base portion as shown in FIG. 4. Retainer bolts or screws 40 extend through mounting apertures 37 in the base portion 24 and aligned slots and apertures in the translucent lens 26 and the opaque light shields 38.

Upon illumination of the bulb 16, light is transmitted outwardly through the translucent lens 26 to provide a visual and clear indication of the direction of intended movement of the vehicle on which the light is mounted. The opaque light shields 38 prevent the passage of light outwardly through the portions of the transparent lens 26 overlying the arcuate bulges on the upper and lower portions of the shaft portion 34 of the base portion 24 so that the light passing through the shaft portion of the transparent lens is restricted to a rectangular area thereof. Consequently, a clear and distinct arrow symbol is provided. However, the light can be converted back to the original circular configuration if it should be desired to use the light for other purposes.

Numerous modifications of the preferred embodiment will undoubtedly occur to those of skill in the art and it should be understood that the spirit and scope of the invention is to be limited solely by the appended claims.

For example, although the preferred embodiment has been shown in conjunction with circular turn signal housings, the invention is equally usable with rectangular housings. Also, the invention is equally applicable to rear direction signals.

I claim:

1. A turn signal replacement lens assembly for mounting on a bulb housing having an outer housing portion positioned about a bulb socket, said lens comprising:
   a base portion including mounting means matingly engageable with and supported on the outer housing portion and having a periphery defining a direction indicating symbol extending transversely outwardly beyond the periphery of the housing portion;
   an outer translucent lens mounted on said base portion and having a periphery that is substantially concentric with the periphery of said base portion; and
   retaining means for retaining said outer translucent lens and base portion on said bulb housing.

2. A turn signal replacement lens assembly as recited in claim 1 wherein said base portion is formed of opaque material.

3. A turn signal replacement lens assembly as recited in claim 2 wherein said base portion includes a base plate and an outwardly extending flange defining the periphery of said base portion and wherein said mounting means comprises an inwardly extending cylindrical flange extending inwardly from said base plate and having an internal diameter slightly greater than the outer diameter of said outer housing portion, which is of cylindrical configuration, so as to be matingly fittable thereover.

4. A turn signal replacement lens assembly as recited in claim 3 wherein said base plate includes a bulb receiving aperture in alignment with said bulb socket when said base portion is mounted on said cylindrical housing portion.

5. A turn signal replacement lens assembly as recited in claim 4 wherein said direction indicating symbol is an arrow and said base plate includes a head portion and a horizontal generally rectangular shaft portion of said arrow symbol.

6. A turn signal replacement lens assembly as recited in claim 5 wherein said inwardly extending cylindrical flange extends inwardly from said generally rectangular shaft portion and has a diameter of larger dimension than the width dimension of said rectangular shaft portion so as to define arcuate bulges in said base plate from opposite sides thereof.

7. A turn signal replacement lens assembly as recited in claim 6 additionally including opaque light shields mounted on said arcuate bulges of said base plate to prevent light from a bulb in said socket from exiting through portions of the translucent lens overlying said arcuate bulges.

8. A turn signal replacement lens assembly as recited in claim 7 wherein said retainer means comprises threaded screw means extending through said base portion and said lens and being threadably connected to said bulb housing.

9. A turn signal replacement lens assembly as recited in claim 1 wherein said direction indicating symbol is an arrow.

10. A turn signal replacement lens as recited in claim 9 wherein said base portion is formed of opaque plastic material.

11. A turn signal assembly comprising:
    a bulb housing having an outer cylindrical housing portion concentrically positioned about a bulb socket;
    a lens assembly including a base portion and mounting means extending from said base portion matingly engageable with and supported on the outer cylindrical housing portion of said bulb housing and having a periphery defining a direction indicating symbol extending transversely outwardly beyond the periphery of the cylindrical housing portion;
    an outer translucent lens mounted on said base portion and having a periphery that is substantially concentric with the periphery of said base portion; and
    retaining means for retaining said outer translucent lens and base portion on said bulb housing.

12. A turn signal assembly as recited in claim 11 wherein said base portion is formed of opaque material.

13. A turn signal assembly as recited in claim 11 wherein said base portion includes a base plate formed of opaque material and an outwardly extending flange defining the periphery of said base portion and wherein said mounting means comprises an inwardly extending cylindrical flange extending inwardly from said base plate and having an internal diameter slightly greater than the outer diameter of said outer cylindrical housing portion so as to be matingly fittable thereover.

14. A turn signal assembly as recited in claim 13 wherein said base plate includes a bulb receiving aperture in alignment with said bulb socket when said base portion is mounted on said cylindrical housing portion; and
    bulb means mounted in said bulb socket and extending into a hollow chamber provided between said base plate and said outer translucent lens.

15. A turn signal assembly as recited in claim 14 wherein said direction indicating symbol is an arrow and said base plate includes a head portion and a horizontal generally rectangular shaft portion of said arrow symbol.

16. A turn signal assembly as recited in claim 15 wherein said inwardly extending cylindrical flange extends inwardly from said generally rectangular shaft portion and has a diameter of larger dimension than the transverse dimension of said rectangular shaft portion so as to define transverse arcuate bulges in said base plate from opposite sides thereof.

17. A turn signal assembly as recited in claim 16 additionally including opaque light shields mounted on said arcuate bulges of said base plate to prevent light from said bulb in said bulb socket from exiting through portions of the translucent lens overlying said arcuate bulges.

18. A turn signal assembly as recited in claim 17 wherein said retainer means comprises threaded screw means extending through said base portion and said lens and being threadably connected to said bulb housing.

19. A turn signal replacement lens assembly as recited in claim 11 wherein said direction indicating symbol is an arrow.

* * * * *